BANDPASS FILTERS

Filed June 13, 1958

INVENTOR.
LEO STORCH,
BY Robert H. Himes
AGENT

INVENTOR.
LEO STORCH,
BY Robert H. Himes
AGENT

April 18, 1961 L. STORCH 2,980,872

BANDPASS FILTERS

Filed June 13, 1958 3 Sheets-Sheet 3

$C_p = C_a - C_b$

INVENTOR.
LEO STORCH,
BY Robert H. Himes
AGENT.

2,980,872
Patented Apr. 18, 1961

2,980,872

BANDPASS FILTERS

Leo Storch, Los Angeles, Calif., assignor to Hughes Aircraft Company, Culver City, Calif., a corporation of Delaware Filed June 13, 1958, Ser. No. 741,790
10 Claims. (Cl. 333—72)

This invention relates to frequency selective networks and more particularly to bandpass filters with bandwidths ranging smoothly and without gaps from approximately 0.01% to approximately 6% of the center frequency.

Quartz crystals posses several very attractive properties, such as very accurate series-resonant frequencies, very high Q's, a high degree of temperature stability, and a small volume at the higher frequencies, which explain their importance as circuit elements in many applications. In high-frequency bandpass filter applications, their high Q's are of particular importance. More particularly, in applications of this type it is generally considered essential that the respective Q's of the components must exceed the reciprocal of the desired fractional bandwidth of the filter by a substantial margin. Consequently, quartz crystals can be employed to achieve bandpass characteristics with fractional bandwidths (i.e. ratios of the 3 db or 6 db bandwidth to the center frequency) which are unobtainable with inductors and capacitors because of the relatively substantial dissipation which is always associated with inductive elements in actual construction.

Quartz crystals, on the other hand, impose certain limitations in the design of bandpass filters which employ them as the principal resonators. In the past, one has had to differentiate between three separate regions of fractional bandwidth on this account. For example, a Class (*a*) region includes bandwidths up to 0.25% and a Class (*b*) region comprises bandwidths from 1.5% to 6%. Further, if it is assumed that coil Q's in excess of 80 are not acceptable, the region of fractional bandwidth extending from approximately 0.25% to approximately 1.5% is so difficult to cover that it may be designated as "no-man's land." That is, it is beyond the reach of crystal-capacitor filters and, on the other hand, the fractional bandwidth is too small to combine coils with crystals and capacitors so as to form filter sections more complex than the Class (*a*) type. In the first or Class (*a*) region, quartz crystals and capacitors constitute the effective circuit elements. The maximum fractional bandwidth could not exceed a value $1/r$, where "$r$" signifies the ratio of the holder capacitance to the crystal capacitance for the specific crystal cut being used. For AT-cut crystals, which are of primary importance at the higher frequencies, the nominal value of the capaitance ratio is usually assumed to be 250, but may run closer to 300 or higher, particularly for filter crystals. Even when the value of 300 is adopted, making allowance for some added padding capacitance, the maximum fractional bandwidth obtainable has been in the vicinity of 0.25% for filters with very sharp cut-offs. So far, fundamental-mode operation has been assumed, which means that the center frequency cannot exceed approximately 30 mc. for AT-cut crystals. Above this value of center frequency, only ⅑ of the previously stated maximum fractional bandwidth could be achieved, assuming that satisfactory third-overtone filter crystals are available.

The passband behavior of Class (*a*) filters usually leaves much to be desired when sharp cut-off characteristics are specified. When the specified fractional bandwidth lies in the vicinity of the maximum possible value, it is particularly hard to prevent the presence of excessive passband ripple. Consequently, it is often necessary to compromise between sharpness of the cut-off characteristics and relative smoothness of the insertion loss curve in the passband.

Another constraint is introduced when the fractional bandwidth approaches the maximum possible value. A technique which will henceforth be described as the "crystal-parameter equalization technique," becomes inapplicable under these conditions. This happens because the margin in the capacitance ratio, which is a prerequisite for its application, disappears. This technique makes it normally possible to circumvent the need for crystals with dissimilar equivalent circuits, so that it is of great importance in arriving at network realizations with optimized characteristics for a given number of crystals employed in the filter, because the range over which the parameters of the equivalent circuit can be adjusted by the manufacturer is quite small for crystals above 10 mc. The deprivation of the crystal-parameter equalization technique is also felt seriously in the actual adjustment of the network, since this technique can be utilized for compensating reasonable deviations from the specified values of the crystal series-resonant frequencies and circuit parameters in the actual set-up of the filter. This is in addition to its function in the design as discussed above.

Moreover, the existence of the maximum possible fractional bandwidth value, separating the region suitable for crystal-capacitor filters from "no-man's land," is often an objectionable design constraint as much, because many systems call for fractional bandwidths beyond this borderline but not larger than 1.5%.

In the second class of filters, that is in Class (*b*) filters, where the fractional bandwidth is in excess of approximately 1.5%, more desirable characteristics can be produced. This is due to the effect of the coils which are introduced into the circuit and now act as effective circuit elements in addition to quartz crystals and capacitors. The passband characteristic can be made satisfactorily smooth. The capacitance ratio called for by the design is usually large relative to a given fractional bandwidth value. Consequently, it is again possible to employ the crystal-parameter equalization technique and to obtain optimized characteristics for a given number of quartz-crystal resonators.

It is apparent then that it is desirable to combine coils with quartz crystals and capacitors in order to form filters with desirable characteristics. The limitations on doing so are the rather low coil Q's obtainable in practice and, in particular, when incorporated in compactly packaged, miniaturized equipments.

It is, therefore, an object of the present invention to provide an improved bandpass filter which possesses substantially flat passband behavior coupled with a sharp cut-off characteristic.

Another object of the present invention is to provide an imporved bandpass crystal filter that may be adapted to have a fractional bandwith anywhere in the region from 0.01% to approximately 6%.

Still another object of the present invention is to provide a bandpass filter which incorporates high-Q quartz crystal resonators with low-Q inductance-capacitance resonators, thereby to achieve filter designs having properties not attainable when other type or classs of resonator is used exclusively.

A further object of the invention is to provide a high frequency bandpass filter which incorporates a phase inverting transformer to provide an inductance across one pair of terminals of the filter and to enable a four-impedance symmetrical lattice network included therein to be replaced with an equivalent two-impedance network.

A still further object of the invention is to provide a high frequency bandpass filter incorporating high-Q quartz crystal resonators which have a uniform crystal capacitance.

In accordance with the present invention, the Q's for the coils incorporated in the disclosed bandpass filter can be specified in advance and set at arbitrarily low values rather than having to exceed the reciprocal of the fractional bandwidth as is presently the case. The design of the disclosed bandpass filter removes the maximum fractional bandwidth barrier from the Class (*a*) region and permits designs for the "no-man's land" region with ease. Also, the filter may be designed for the Class (*b*) region with coils possessing specified Q's which are independent of the fractional bandwidth. A graphic way of describing the principle of operation of the disclosed bandpass filter is to say that the filter is being made to believe that its fractional bandwidth is much larger than it actually is. Consequently it can be made to accept coils with much lower Q's than would otherwise be required.

The bandpass filter of the present invention possesses practically flat passband behavior coupled with a sharp cut-off characteristic and, in addition, makes full use of the number of crystals employed, because the peaks of infinite attenuation are disposed in optimized locations without detrimental effects on the passband ripple. Moreover, the "crystal-parameter equalization technique" is applicable in designing the disclosed bandpass filter. It is thus possible to design for crystals which all possess the same nominal crystal capacitance values and to allow for generous amounts of stray capacitance and winding capacitance of the coils.

More particularly, in accordance with the present invention, the filter comprises at least two impedance branches connected to form a symmetrical lattice network or equivalent. These impedance branches are composed of reactive elements which may be crystals and which have one or more critical frequencies, which may either be resonant frequencies or anti-resonant frequencies. For convenience, the critical frequencies representing resonances are termed "zeros" and those representing anti-resonances are termed "poles." In addition to the usual limitations on the placement of critical frequencies for establishing a passband in the impedance branches of the present device, it is essential that the critical frequencies for establishing the passband be concentrated in the immediate vicinity thereof and, in addition, be bounded by zeros. In addition to the foregoing, the disclosed filter also possesses critical frequencies which define coincident pairs of poles that are spaced substantially equidistant and several times half the bandwidth from the mean frequency of the passband. These latter coincident pairs of poles are provided by low-Q coils which may be considered a part of the impedance branches of the filter.

In an alternate embodiment of the device, low-Q resonators which appear in each impedance element of a symmetrical lattice network are transposed to appear across the input and output terminals of the filter. Further, in a still different embodiment, a unity turns ratio phase inverting transformer is employed both to provide the low-Q inductance across one pair of terminals of the previous embodiment and, in addition, enable the replacement of the four-impedance symmetrical lattice network with an equivalent two-impedance network.

For a better understanding of the invention, together with other and further objects thereof, reference is made to the following description taken in conjunction with the accompanying drawings, given by way of example, wherein:

Figs. 6 and 7 show schematic circuit diagrams of alternate embodiments of the bandpass filter of the present invention.

Figure 1:
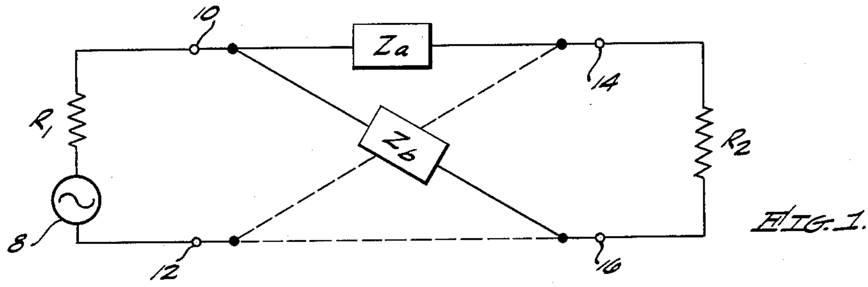
Fig. 1 illustrates an embodiment of the present invention wherein the disclosed reactive impedance elements are incorporated in a symmetrical lattice network.

Referring now to Fig. 1, there is shown the lattice filter of the present invention wherein a voltage source 8 of internal resistance $R_1$ is connected across input terminals 10, 12. Series impedance branches $Z_a$ are then connected from one of the input terminals 10, 12 to a corresponding output terminal 14 or 16. Diagonal impedance branches $Z_b$, on the other hand, are connected from one of the input terminals 10, 12 to a diagonally opposite output terminal 16, 14, respectively. The output terminals 14, 16 are, in turn, connected across a resistor $R_2$. The resistance which effectively appears across the input terminals 10, 12 and the output terminals 14, 16, is designated as the load resistor, $R_L$. In the present instance, $R_L$ would equal the resistance of $R_1$ in parallel with the resistance of the filter which appears across input terminals 10, 12. Likewise, $R_L$ would also equal the resistance of $R_2$ in parallel with the resistance which appears across the output terminals 14, 16 of the filter. In order to avoid a mismatch with its concomitant reflections, the resistance of $R_L$ is generally made approximately equal to 70% of the mid-frequency impedance $R_0$ of the filter.

In the case of image parameter design, $$R_0=\sqrt{Z_aZ_b}|_{\omega=\omega_0} \qquad (1)$$

where $\omega_0$ is the mean angular frequency of the passband of the filter. When determining the attenuation and transmission characteristics of a filter, it is generally first assumed that the impedance branches $Z_a$ and $Z_b$ are pure reactances. Making this assumption, it can be shown by conventional design techniques that $Z_a$ and $Z_b$ generally have opposite signs throughout a transmission range and are of the same sign throughout an attenuation range.

As a practial matter, it is the practice when diagramming the characteristics of a reactive impedance, $Z_a$ or $Z_b$ to represent a resonant frequency or zero by a "0" and an antiresonant frequency or pole by an "*x*." These poles and zeros will always alternate, that is, there will never be two immediately adjacent poles or zeros that are not separated, respectively, by a zero or pole. From present-day design techniques, it can be shown that within the transmission band of the filter, the zeros and poles are substantially inversely coincident, that is, the zeros of the one impedance branch are substantially coincident with the poles of the other impedance branch. In the attenuation ranges, on the other hand, the zeros and poles of the two impedances are normally directly coincident, zeros with zeros and poles with poles.

From the above concepts, it is apparent that there are innumerable combinations of impedances which can be used in combination to provide a filter. It is not the purpose of the present invention to determine the exact placement of critical frequencies throughout the transmission range. For the purpose of simplicity, and not as a limitation, however, it will be assumed that the critical frequencies of the impedance branches $Z_a$ and $Z_b$ throughout the passband of the disclosed filter are substantially inversely coincident.

Figure 2:
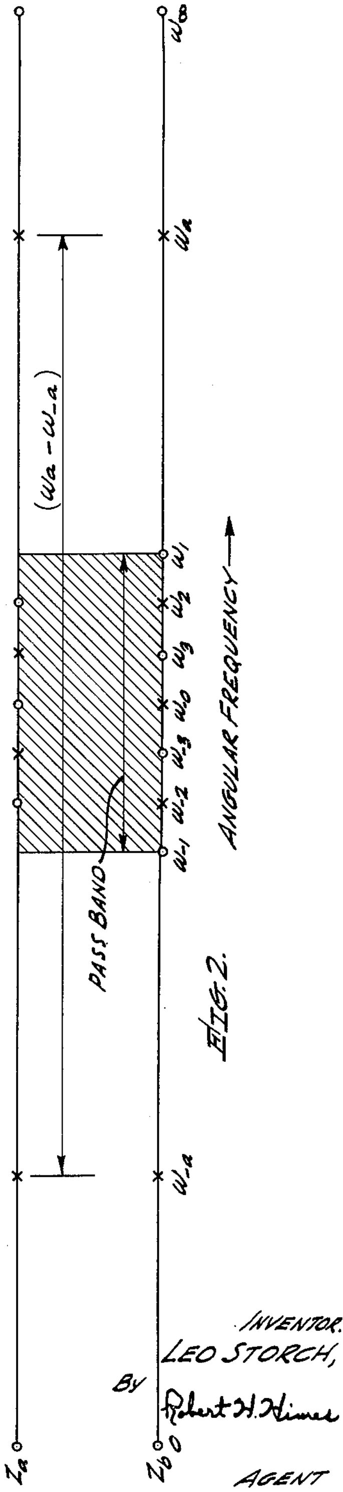
Fig. 2 illustrates the disposition of the critical frequencies of the impedance elements of the network of Fig. 1.

In accordance with the present invention, the critical frequencies of the impedance branches $Z_a$ and $Z_b$ which establish the transmission range are clustered in the immediate vicinity thereof and are bounded by zeros. In addition, the impedance branches $Z_a$ and $Z_b$ possess critical frequencies which define coincident pairs of poles disposed above and below the aforementioned cluster of critical frequencies. These coincident pairs of poles are preferably spaced equidistant from the mean angular frequency and several times one-half the bandwidth therefrom. The disposition of the critical frequencies of a representative embodiment of the impedance branches $Z_a$ and $Z_b$ in accordance with the present invention is illustrated in Fig. 2. Referring to this figure, the angular frequencies have the relationship:

$$0 \ldots \omega_{-a} \quad \omega_{-1} \quad \omega_{-2} \quad \omega_{-3} \quad \omega_0 \quad \omega_3 \quad \omega_2 \quad \omega_1 \quad \omega_a \quad \omega_\infty = \infty$$

It may be noted that the critical frequencies of the impedance branch $Z_a$ which occur at the angular frequencies $\omega_{-2}$, $\omega_{-3}$, $\omega_0$, $\omega_3$, $\omega_2$ together with the critical frequencies of impedance branch $Z_b$ which occur at the angular frequencies $\omega_{-1}$, $\omega_{-2}$, $\omega_{-3}$, $\omega_0$, $\omega_3$, $\omega_2$, and $\omega_1$ establish the transmission range of the filter. The disposition of these critical frequencies is made in accordance with present day filter design techniques with the limitation that there be a zero at the highest and lowest frequency in each cluster of critical frequencies provided by each impedand branch $Z_a$ and $Z_b$. In addition to the foregoing, the impedance branches $Z_a$ and $Z_b$ effectively possess critical frequencies which define coincident poles at the angular frequencies $\omega_{-a}$ and $\omega_a$ which occur outside the aforementioned clusters of critical frequencies which establish the transmission range, and at frequencies that are substantially equidistant from the mean angular frequency of the passband. The angular frequencies $\omega_{-a}$ and $\omega_a$ may, for example, be located at frequencies that are spaced $\sqrt{10}$ times one-half the bandwidth of the filter form the mean angular frequency $\omega_0$ of the passband.

The impedance branches $Z_a$ and $Z_b$ having the critical frequencies illustrated in Fig. 2 may be represented mathematically by the following equations:

$$Z_a = jK_a \cdot \frac{\omega(\omega_{-2}^2-\omega^2)(\omega_0^2-\omega^2)(\omega_2^2-\omega^2)}{(\omega_{-a}^2-\omega^2)(\omega_{-3}^2-\omega^2)(\omega_3^2-\omega^2)(\omega_a^2-\omega^2)} \quad (2)$$

$$Z_b = jK_b \cdot \frac{\omega(\omega_{-1}^2-\omega^2)(\omega_1^2-\omega^2)(\omega_{-3}^2-\omega^2)(\omega_3^2-\omega^2)}{(\omega_{-a}^2-\omega^2)(\omega_{-2}^2-\omega^2)(\omega_0^2-\omega^2)(\omega_2^2-\omega^2)(\omega_a^2-\omega^2)} \quad (3)$$

wherein $K_a$ and $K_b$ are positive real constants.

By inspection of the Equation 2 for the impedance branch $Z_a$, it is seen that it possesses poles at the angular frequencies $\omega_{-a}$, $\omega_{-3}$, $\omega_3$ and $\omega_a$ and has zeros at $\omega=0$, $\omega_{-2}$, $\omega_0$, $\omega_2$, and $\omega_\infty$. Similarly, from Equation 3 it is evident that $Z_b$ possesses poles at the angular frequencies $\omega_{-a}$, $\omega_{-2}$, $\omega_0$, $\omega_2$ and $\omega_a$ and zeros at the angular frequencies $\omega=0$, $\omega_{-1}$, $\omega_1$, $\omega_{-3}$, $\omega_3$ and $\omega_x$.

Figure 3:
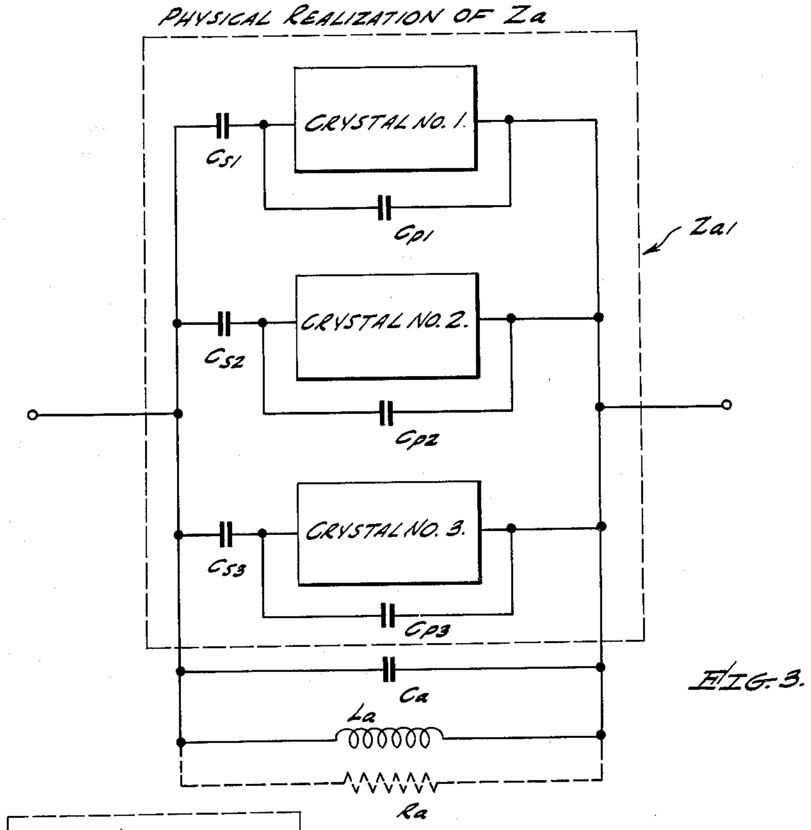
Figs. 3 and 4 show schematically how the impedance elements of the network of Fig. 1 may be physically realized.
Figure 4:
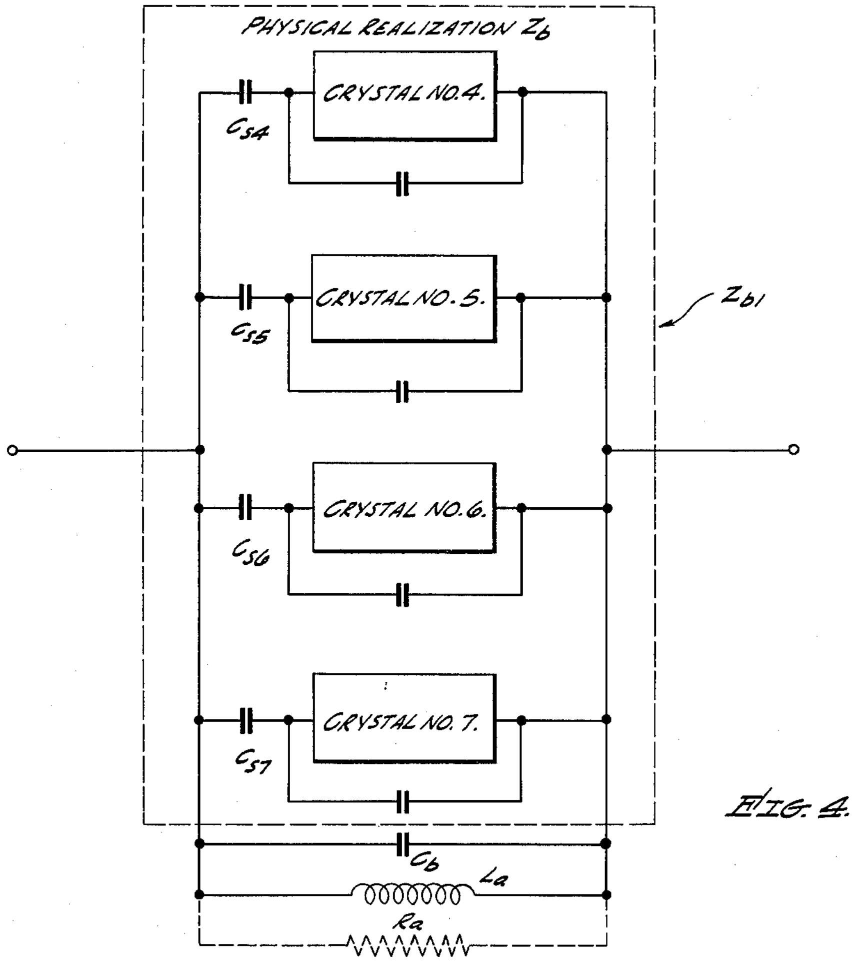

A manner of physically realizing the impedance branches $Z_a$ and $Z_b$ is illustrated in Figs. 3 and 4, respectively. By way of example, it will be assumed that a center frequency of 10 mc. with a 6 db bandwidth of 50 kilocycles is desired. The fractional bandwidth in this case would be $50{,}000/(10\times10^6)=0.05$. It is thus evident that in a conventional type filter, the Q of any reactive elements would have to be in excess of 200 which, as a practical matter, would restrict the reactive elements to crystals. In the aforementioned example of the present invention, however, the impedance branches include a coil which has a $$Q = \frac{(\text{angular bandwidth})^2}{(\omega_a-\omega_{-a})^2} \cdot \frac{1}{\Delta} = \frac{200}{10} = 20$$

wherein $\Delta$ is the fractional bandwidth of the filter and $(\omega_a-\omega_{-a})$ is the angular frequency interval between the aforementioned critical frequencies which define coincident poles.

Figure 5:
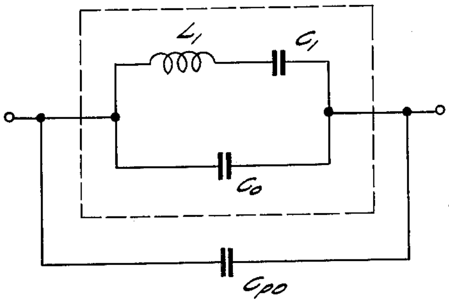
Fig. 5 shows an equivalent circuit diagram of a filter crystal of the impedance elements shown in Figs. 3 and 4.
Figure 1:
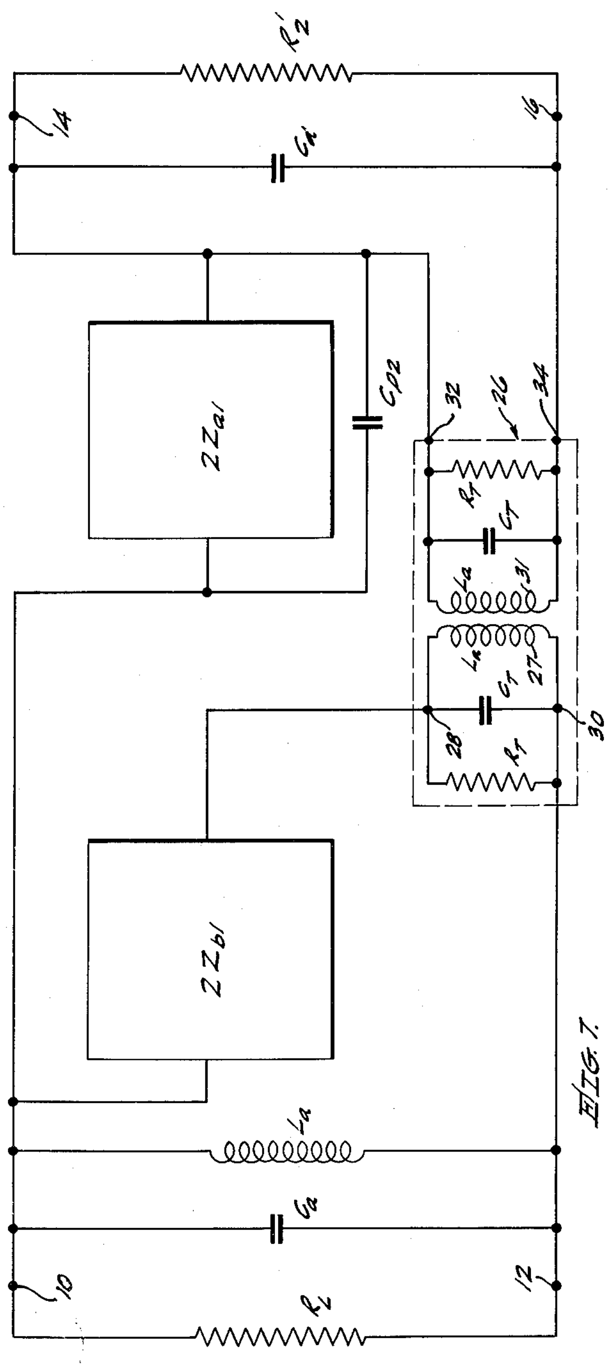

More particularly, referring to Fig. 5, the equivalent circuit of a filter crystal comprises the series combination of an inductor $L_1$ and a capacitor $C_1$ in parallel with a capacitor $C_0$ wherein the magnitudes of $C_0$ and $C_1$ are the holder and crystal capacitance, respectively, for the specific crystal cut being used. The actual crystal capacitance ratio would then be the ratio of the holder capacitance to crystal capacitance, which ratio for AT-cut crystals is usually assumed to be in the range of from 250 to 300. In the event that the filter capacitor is padded with a padding capacitor, $C_{p0}$, the effective crystal capacitance ratio becomes:

$$\text{Effective } r = \frac{C_0 + C_{p0}}{C_1}$$

In the realization of the impedance branches $Z_a$ and $Z_b$, as will hereinafter be explained in more detail, there is included a low-Q parallel resonant circuit which contains sufficient capacitance which can be used for padding purposes as to enable crystals having a uniform crystal capacitance $C_1$ to be employed throughout the filter.

Referring now to Fig. 3, the impedance branch $Z_a$ may be physically realized by the parallel combination $Z_{a1}$ comprising capacitors $C_{s1}$, $C_{s2}$ and $C_{s3}$, connected respectively, in series combination with crystals No. 1, 2 and 3 which are, for example, AT-cut. The crystals No. 1, 2 and 3 are, in turn, padded with capacitors $C_{p1}$, $C_{p2}$ and $C_{p3}$, respectively, so the net result is that the zeros of the combined network occur at the desired frequencies. In addition, it is necessary that the impedance branch $Z_a$ include a capacitor $C_a$ and an inductor $L_a$ which shunt the aforementioned parallel combination $Z_{a1}$. For the example being illustrated, the inductor $L_a$, as mentioned above, has a $Q_L$ greater than or equal to $$\frac{R_L}{\omega_0 L_a}$$

which may, for example be arbitrarily set equal to 20. Also, because of the low-Q of inductor $L_a$, it has a resistance which cannot be neglected. Throughout the passband this resistance may be taken into consideration by means of a resistance $R_a$ connected in parallel with the inductor $L_a$. The resistance $R_L$, which is used in computing $Q_L$, the effective Q of the inductor $L_a$, is equal to the resistance $R_a$ in parallel, respectively, with $R_1$ and $R_2$. In addition, in accordance with the present invention $Q_L$ is necessarily less than $1/\Delta$ wherein $\Delta$ has previously been defined as the fractional bandwidth of the filter. An additional requirement is that the inductor $L_a$, the capacitor $C_a$ and the effective shunt capacitance of the parallel combination $Z_{a1}$ be anti-resonant at the mean angular frequency $\omega_0$ of the pass-band of the filter.

Similarly, referring to Fig. 4, the impedance branch $Z_b$ may be physically realized by the parallel combination $Z_{b1}$ of capacitors $C_{s4}$, $C_{s5}$, $C_{s6}$ and $C_{s7}$ connected, respectively, in series combination with crystals No. 4, 5, 6 and 7 which may, as before, be AT-cut. As in the case of impedance branch $Z_{a1}$, the crystals No. 4, 5, 6 and 7 are padded with capacitors $C_{p4}$, $C_{p5}$, $C_{p6}$ and $C_{p7}$, respectively. The net result of the crystals No. 4, 5, 6 and 7 being thus connected in series with the capacitors $C_{s4}$, $C_{s5}$, $C_{s6}$ and $C_{s7}$ and padded with the capacitors $C_{p4}$, $C_{p5}$, $C_{p6}$ and $C_{p7}$ is to produce the critical frequencies that define zeros at the angular frequencies $\omega_{-1}$, $\omega_{-3}$, $\omega_3$ and $\omega_1$. In addition to the parallel combination $Z_{b1}$ the impedance branch $Z_b$ is necessarily shunted by a capacitor $C_b$ in parallel with an inductor $L_a$ which inductor preferably possesses the same inductance as the inductor $L_a$ included in the impedance branch $Z_a$ and an effective shunt resistance, $R_a$, throughout the pass-band. As in the case of impedance branch $Z_a$, the capacitance of capacitor $C_b$ is chosen so that an anti-resonance occurs at the angular frequency $\omega_0$. In the above description it is to be noted that the disposition of the poles and zeros of the reactive impedance branches $Z_a$ and $Z_b$ within the pass-band is made in accordance with comprehensive and well-established design techniques.

Figure 6:
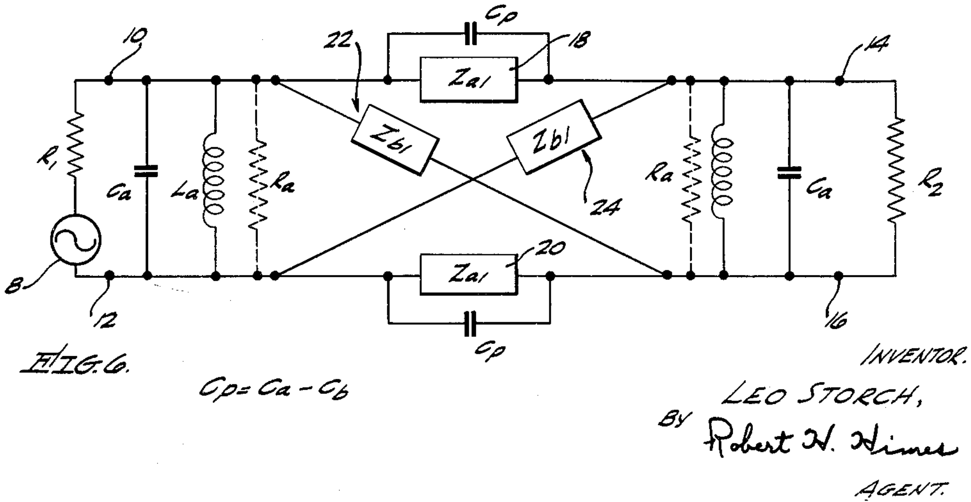

It may be noted that both of the impedance branches $Z_a$ and $Z_b$ contain the inductor $L_a$ and a capacitor in the form of either $C_a$ or $C_b$ in parallel with the remaining crystals. To the extent that the inductance and capacitance of these elements are common to both impedance branches $Z_a$ and $Z_b$, they may be transposed to appear across the input and output terminals 10, 12 and 14, 16, respectively, of the filter. Thus, for example, if the capacitance $C_a$ which is included in the impedance branch $Z_a$ is greater than the capacitance $C_b$ of the impedance branch $Z_b$, it is evident that the inductor $L_a$ and a capacitor of capacitance $C_b$ is common to each impedance branch $Z_a$ and $Z_b$ of the symmetrical lattice of Fig. 1. Referring now to Fig. 6, it is apparent from the foregoing that an alternate embodiment of the bandpass crystal filter of the present invention may comprise a symmetrical lattice network with an inductor $L_a$ and capacitor $C_b$ connected in parallel across both the input terminals 10, 12 and the output terminals 14, 16. Also, in view of the fact that the inductor $L_a$ has a low-Q, the resistance $R_a$ now effectively appears across the input terminals 10, 12 and the output terminals 14, 16. Further, in that the inductor $L_a$ and capacitor $C_b$ have been removed from impedance branch $Z_a$, series impedance branches 18, 20 of the alternate embodiment of the filter may each be provided by the remaining elements of impedance branch $Z_a$, namely parallel combination $Z_{a1}$, shunted by a capacitor of capacitance $C_p=C_a-C_b$. Diagonal impedance elements 22, 24, on the other hand, are defined by the parallel combination $Z_{b1}$ which remains in impedance branch $Z_b$ after the inductor $L_a$ and capacitor $C_b$ have been removed therefrom. It is, of course, quite possible that the capacitance $C_b$ may be greater than the capacitance $C_a$ in which case the capacitance representing the difference between $C_a$ and $C_b$ will shunt the parallel combination $Z_{b1}$. Further, although $Z_{a1}$ and $Z_{b1}$ have been illustrated as being parallel combinations, it is to be realized that the equivalent "dual" may be substituted therefor and still accomplish the same result. As this expedient is well known to the art, it will not be explained in further detail.

Referring now to Fig. 7, there is shown another alternative embodiment of the bandpass filter of the present invention which incorporates a 1:1 phase inverting transformer 26 which has a primary winding 27 with input terminals 28, 30 and a secondary winding 31 with output terminals 32, 35. In general, by means of the phase inverting transformer 26 the symmetrical lattice portion of the bandpass filter of Fig. 6 is replaced by its equivalent whereby the secondary winding 31 is connected across the output terminals 14, 16 of the filter. This latter connection makes it possible to replace the inductor $L_a$ connected across the output terminals 14, 16 with the self-inductance of the transformer 26 together with its equivalent resistance and capacitance. That is, the effective resistance, capacitance and inductance which is effective on the secondary side of the transformer 26 is utilized as an essential part of the circuitry of the filter.

In particular, the capacitor $C_b$ and the inductor $L_a$ are connected in parallel across the input terminals 10, 12 as in the case of the bandpass filter of Fig. 6. The resistance $$R_L=\frac{R_1R_a}{R_1+R_a}$$

also appears thereacross. An impedance $2Z_{b1}$ defined as two times the parallel combination $Z_{b1}$ in the filter of Fig. 6 is then connected from the input terminal 10 to input terminal 28 of the primary winding 27 of the transformer 26, and the remaining input terminal 30 returned to the input terminal 12 of the filter. In addition, an impedance $2Z_{a1}$ defined as two times the parallel combination $Z_{a1}$ shunted by a capacitor of capacitance $C_p/2$ is connected from the input terminal 10 of the filter to the output terminal 14 of the filter and to the output terminal 32 of the secondary winding 31 of the transformer 26. The remaining output terminal 34 of the secondary winding 31 of the transformer 26 is connected to the remaining output terminal 16 of the filter. The primary and secondary windings 27, 31 of transformer 26 have a turns ratio of 1:1 and are poled so that a phase reversal occurs between input terminals 28, 30 and output terminals 32, 34, respectively.

The transformer 26 is as near an ideal transformer as is practical. Assuming this to be true, the transformer 26 will preferably have a self-inductance and Q which are substantially the same as those of the inductor $L_a$. Further, the effective primary and secondary shunt capacitances of the transformer are the same and both equal to $C_T$. Similarly, the effective primary and secondary resistances may be assumed to shunt the primary and secondary windings throughout the narrow range of the pass-band. These resistances are the same and are both equal to $R_T$. Because the turns ratio of the transformer is 1:1 and since the coupling of the transformer 26 approaches that of an ideal transformer, the aforementioned resistance $R_T$ and capacitance $C_T$ appearing across the primary winding terminals 28, 30 may be transposed so as to appear across the secondary winding terminals 32, 34 which are the same as the output terminals 14, 16 of the filter. Accordingly, the self-inductance $L_a$ of the transformer 26 serves to replace the inductor $L_a$ across the output terminals 14, 16 of the filter. Also, in that the output terminals 14, 16 are shunted by capacitance equal to $2C_T$, an output capacitor of capacitance $C_d=C_b-2C_T$ is connected thereacross. Lastly, a load resistor which has a resistance $$R_2'=\frac{R_LR_T}{R_L-2R_T} \tag{4}$$

wherein $$R_L=\frac{R_1R_a}{R_1+R_a}$$

as before, is connected across the output terminals 14, 16. It is to be noted that when $R_2'$ is connected in parallel with the two resistors each of a resistance $R_T$, the resulting resistance becomes equal to $R_L$, the same as the effective resistance across the input terminals 10, 12 of the filter.

What is claimed is:

1. A bandpass wave filter having a predetermined angular bandwidth with a mean angular frequency and a predetermined fractional bandwidth, Δ, said filter including a pair of input terminals, a pair of output terminals, and at least first and second impedance branches connected between said pairs of input and output terminals to form a symmetrical lattice type network, said first impedance branch comprising a first plurality of impedances including, respectively, a first plurality of piezo-electric crystal elements connected in parallel combination for producing a corresponding first plurality of critical frequencies defining resonances in the immediate vicinity of said mean angular frequency, and a first capacitor and a first inductor adapted to produce antiresonance at said mean angular frequency connected in parallel with said first plurality of impedances, said first inductor having a $Q_1$ this is less than said mean angular frequency divided by said predetermined angular bandwidth thereby to produce critical frequencies defined by first and second antiresonant frequencies disposed above and below said first plurality of critical frequencies, respectively, and spaced from said mean angular frequency by an interval that is greater than one-half said predetermined bandwidth and substantially equal to one-half said angular bandwidth divided by $\sqrt{Q_1\Delta}$ radians; said second impedance branch comprising a second plurality of impedance including, respectively, a second plurality of piezo-electric crystal elements for producing a corresponding second plurality of critical frequencies defining a resonant frequency intermediate each successive pair of said first plurality of critical frequencies defining resonances, and a second capacitor and a second inductor adapted to produce anti-resonance at said mean angular frequency connected in parallel with said second plurality of impedances, said second inductor having a $Q_2$ substantially equal to said $Q_1$ of said first inductor thereby to produce critical frequencies defined by third and fourth anti-resonant frequencies that are coincident with said first and second anti-resonant frequencies, respectively.

2. The bandpass wave filter having a predetermined angular bandwidth with a mean angular frequency as defined in claim 1, wherein said first and second inductors of said first and second impedance branches, respectively, each possess the same inductance.

3. The bandpass wave filter having a predetermined angular bandwidth with a mean angular frequency as defined in claim 1, wherein each of said piezo-electric crystal elements of said first and second pluralities thereof possess a uniform crystal capacitance.

4. The bandpass wave filter having a predetermined bandwidth with a mean angular frequency as defined in claim 1, wherein the effective $Q_1$ and $Q_2$ of said first and second inductors included in said first and second impedance branches, respectively, are each less than 50% of the reciprocal of the fractional bandwidth, $\Delta$, of the filter.

5. A bandpass wave filter having a predetermined angular bandwidth with a mean angular frequency and a predetermined fractional bandwidth, $\Delta$, said filter including a pair of input terminals, a pair of output terminals, a first pair of impedance branches, each of which are connected from a different input terminal to a corresponding output terminal, said first impedance branches each comprising a first plurality of impedances including, respectively, a first plurality of piezo-electric crystal elements connected in parallel combination for producing a corresponding first plurality of critical frequencies defining resonances in the immediate vicinity of said mean angular frequency and a first capacitor and a first inductor adapted to produce anti-resonance at said mean angular frequency connected in parallel with said first plurality of impedances, said first inductor having a $Q_1$ that is less than said mean angular frequency divided by said predetermined angular bandwidth, thereby to produce critical frequencies defined by first and second anti-resonant frequencies which occur above and below said first plurality of critical frequencies, respectively, and which are spaced from said mean angular frequency by an interval that is greater than one-half said predetermined bandwidth and substantially equal to one-half said angular bandwidth divided by $\sqrt{Q_1\Delta}$ radians; a pair of second impedance branches each connected from a different input terminal to a diagonally opposite output terminal, each of said second impedance branches comprising a second plurality of impedances including, respectively, a second plurality of piezo-electric crystal elements for producing a corresponding second plurality of critical frequencies defining a resonant frequency intermediate each successive pair of said first plurality of critical frequencies defining resonances, and a second capacitor and a second inductor adapted to produce anti-resonance at said mean angular frequency connected in prallel with said second plurality of impedances, said second inductor having a Q substantially equal to $Q_1$ of said first inductor thereby to produce critical frequencies defined by third and fourth anti-resonant frequencies that are coincident with said first and second anti-resonant frequencies, respectively.

6. A bandpass wave filter having a predetermined angular bandwidth with a mean angular frequency and a predetermined fractional bandwidth, $\Delta$, said filter including a pair of input terminals, a pair of output terminals, and at least first and second impedance branches connected between said pairs of input and output terminals to form a symmetrical lattice type network, said first impedance branch comprising a first plurality of impedances including, respectively, a first plurality of piezo-electric crystal elements for producing a corresponding first plurality of critical frequencies defining resonances which occur at no more than one-half said bandwidth from said mean angular frequency and a first capacitor connected in parallel with said first plurality of impedances; said second impedance branch comprising a second plurality of impedances including, respectively, a second plurality of piezo-electric crystal elements for producing a corresponding second plurality of critical frequencies defining a resonant frequency intermediate each successive pair of said first plurality of critical frequencies defining resonances and a second capacitor connected in parallel with said second plurality of impedances; and first and second inductors connected, respectively, across said input and output terminals, said first and second inductors each being of an inductance to produce, in conjunction with said first and second capacitors an anti-resonance at said mean angular frequency, each of said first and second inductors having, in addition a Q that is less than said mean angular frequency divided by said predetermined bandwidth, thereby to produce coincident critical frequencies defined by anti-resonant frequencies disposed above and below said first and second pluralities of critical frequencies and spaced from said mean angular frequency by an interval that is greater than one-half said predetermined bandwidth and substantially equal to one-half said angular bandwidth divided by $\sqrt{Q\Delta}$ radians.

7. A bandpass wave filter having a predetermined angular bandwidth with a mean angular frequency and a predetermined fractional bandwidth, $\Delta$, said filter including a pair of input terminals, a pair of output terminals, and at least first and second impedance branches connected between said pairs of input and output terminals to form a symmetrical lattice type network, said first impedance branch comprising a first plurality of impedances including respectively, a first plurality of piezo-electric crystal elements for producing a corresponding first plurality of critical frequencies defining resonances which occur at no more than one-half said bandwidth from said mean angular frequency; said second impedance branch comprising a second plurality of impedances including, respectively, a second plurality of piezo-electric crystal elements for producing a corresponding second plurality of critical frequencies defining a resonant frequency intermediate each successive pair of said first plurality of critical frequencies defining resonances; and first and second inductors and first and second capacitors connected, respectively, across said input and output terminals, said first and second inductors each being of an inductance to produce, in conjunction with said first and second capacitors, anti-resonance at said mean angular frequency, each of said first and second inductors having, in addition, a Q that is less than said mean angular frequency divided by said predetermined angular bandwidth, thereby to produce coincident critical frequencies defined by anti-resonant frequencies disposed above and below said first and second pluralities of critical frequencies and spaced from said mean angular frequency by an interval greater than one-half said predetermined bandwidth and substantially equal to said angular bandwidth divided by $\sqrt{Q\Delta}$ radians.

8. A bandpass wave filter having a predetermined angular bandwidth with a mean angular frequency and a predetermined fractional bandwidth, $\Delta$, said filter including first and second input terminals; first and second output terminals; a first inductor having a predetermined inductance and a first capacitor connected in parallel between said first and second input terminals thereby to provide a first parallel circuit; a substantially ideal transformer having a predetermined self-inductance and primary and secondary windings with a unity turns ratio, said primary winding having first and second input terminals and said secondary winding having first and second output terminals, said primary and secondary windings being poled to effect a phase reversal between said first and second input terminals and said first and second output terminals, respectively, said second input terminal of said primary winding being connected to said second input terminal of said filter and said first and second output terminals of said secondary winding being connected to said first and second output terminals of said filter, respectively; a first impedance branch connected from said first input terminal of said filter to said first input terminal of said primary winding, said first impedance branch including means for producing a first plurality of critical frequencies defining resonances which occur in the immediate vicinity of said mean angular frequency; a second impedance branch connected from said first input terminal of said filter to said first output terminal of said filter, said second impedance branch including means for providing a second plurality of critical frequencies defining resonant frequencies which together with said first plurality of critical frequencies defining resonances produce a transmission range; and a second capacitor of predetermined capacitance connected between said first and second output terminals of said filter to provide a second parallel circuit, said predetermined capacitance being adapted to produce anti-resonance with said predetermined self-inductance of said transformer at said mean angular frequency, the effective Q of said first and second parallel circuits being less than said means angular frequency divided by said predetermined bandwidth thereby to produce critical frequencies which define coincident anti-resonant frequencies disposed above and below said mean angular frequency by an interval substantially equal to one-half said angular bandwidth divided by $\sqrt{Q\Delta}$ radians, said interval being greater than one-half said predetermined angular bandwidth.

9. The bandpass wave filter having a predetermined angular bandwidth with a mean angular frequency as defined in claim 8, wherein said predetermined self-inductance of said substantially ideal transformer is substantially the same as said predetermined inductance of said first inductor.

10. A bandpass wave filter having a predetermined angular bandwidth with a mean angular frequency and a predetermined fractional bandwidth, $\Delta$, said filter including first and second input terminals; first and second output terminals; a first inductor having a predetermined inductance and a first capacitor connected in parallel between said first and second input terminals to provide a first parallel resonant circuit adapted to produce anti-resonance at said mean angular frequency; a substantially ideal transformer having a predetermined self-inductance equal to said predetermined inductance and primary and secondary windings with a unity turns ratio, said primary winding having first and second input terminals and said secondary winding having first and second output terminals, said primary and secondary windings being poled to effect a phase reversal between said first and second input terminals and said first and second output terminals, respectively, said second input terminal of said primary winding being connected to said second input terminal of said filter and said first and second output terminals of said secondary winding being connected to said first and second output terminals of said filter, respectively; a first impedance branch connected from said first input terminal of said filter to said first input terminal of said primary winding, said first impedance branch comprising a first plurality of impedances including, respectively, a first plurality of piezo-electric crystal elements for producing a corresponding first plurality of critical frequencies defining resonances which occur at frequencies that are no more than one-half said predetermined angular bandwidth from said mean angular frequency; a second impedance branch connected from said first input terminal of said filter to said first output terminal of said filter, said second impedance branch comprising a second plurality of impedances including, respectively, a second plurality of piezo-electric crystal elements for producing a corresponding second plurality of critical frequencies which together with said first plurality of critical frequencies produce a transmission range; and a second capacitor of predetermined capacitance connected between said first and second output terminals of said filter to provide a second parallel circuit, said predetermined capacitance being adapted to produce anti-resonance with said predetermined self-inductance of said transformer at said mean angular frequency, the effective Q of said first and second parallel circuits being less than said mean angular frequency divided by said predetermined bandwidth thereby to produce critical frequencies defined by coincident anti-resonant frequencies which occur above and below said mean angular frequency by an interval substantially equal to one-half said angular bandwidth divided by $\sqrt{Q\Delta}$ radians, said interval being greater than one-half said predetermined angular bandwidth.

References Cited in the file of this patent

UNITED STATES PATENTS

| | | |
|---|---|---|
| 1,828,454 | Bode | Oct. 20, 1931 |
| 2,037,171 | Lane | Apr. 14, 1936 |
| 2,216,541 | Och | Oct. 1, 1940 |
| 2,591,838 | Leroy | Apr. 8, 1952 |
| 2,696,591 | Leroy | Dec. 7, 1954 |

OTHER REFERENCES

Kosowsky: "High-Frequency Crystal Filter Design Techniques and Applications," Proceedings of the I.R.E., February 1958, pages 419–429.

Burns: "Sideband Filters Using Crystals," Q.S.T., vol. 38, No. 1, November 1954, pages 35–40 and 148–152.

Weinberg: "Unbalanced RLC Networks Containing Only One Resistance and One Real Transformer," Proceedings of the I.R.E., vol. 42, No. 2, February 1954, pages 467–475.

UNITED STATES PATENT OFFICE

CERTIFICATION OF CORRECTION

Patent No. 2,980,872 April 18, 1961

Leo Storch

It is hereby certified that error appears in the above numbered patent requiring correction and that the said Letters Patent should read as corrected below.

Column 1, line 20, for "posses" read -- possess --; column 2, line 35, for "much" read -- such --; line 62, for "imporved" read -- improved --; line 69, for "other" read -- either --; same line 69, for "classs" read -- class --; column 4, line 47, for "practial" read -- practical --; line 50, for '"O"' read -- "o" --; column 5, line 34, for "form" read -- from --; line 53, for "$\omega_x$." read -- $\omega_\infty$ --; line 59, for "0.05" read -- 0.005 --; column 8, lines 36 and 37, the formula should appear as shown below instead of as in the patent:

$$R_2' = \frac{R_L R_T}{R_T - 2R_L}$$

line 66, for "this" read -- that --; line 75, for "impedance" read -- impedances --; column 9, line 66, for "prallel" read -- parallel --.

Signed and sealed this 12th day of June 1962.

(SEAL)
Attest:

ERNEST W. SWIDER
Attesting Officer

DAVID L. LADD
Commissioner of Patents